S. A. BOSTWICK.
CUTTING AND PUNCHING MACHINE.
APPLICATION FILED SEPT. 14, 1911.
1,026,072.
Patented May 14, 1912.
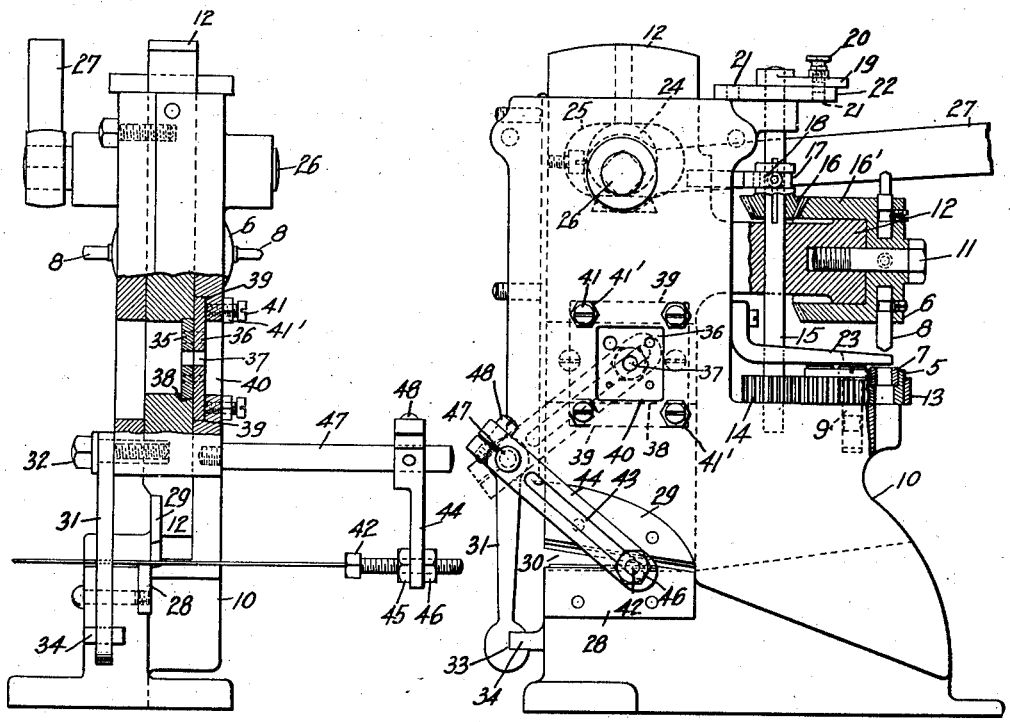
Fig. 1.
Fig. 2.
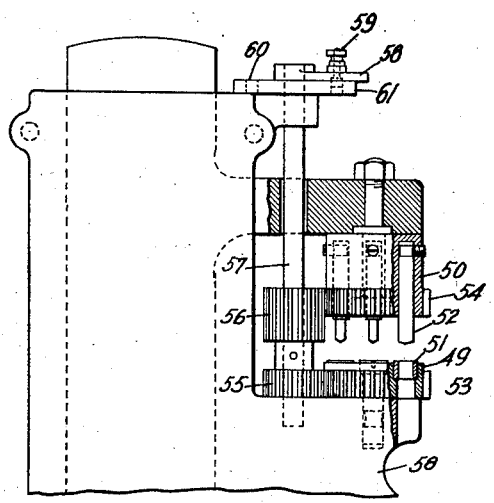
Fig. 3.
Witnesses:
Sydney E. Taft.
Leonard A. Powell.
Inventor:
Seymour A. Bostwick
COLUMBIA PLANOGRAPH CO., WASHINGTON, D. C.

UNITED STATES PATENT OFFICE.

SEYMOUR A. BOSTWICK, OF ROXBURY, MASSACHUSETTS, ASSIGNOR TO PHILIP G. H. BENNET, OF BOSTON, MASSACHUSETTS.

CUTTING AND PUNCHING MACHINE.

1,026,072. Specification of Letters Patent. Patented May 14, 1912.

Application filed September 14, 1911. Serial No. 649,267.

*To all whom it may concern:*

Be it known that I, SEYMOUR A. BOSTWICK, a citizen of the United States, residing at Roxbury, in the county of Suffolk and State of Massachusetts, have invented new and useful Improvements in Cutting and Punching Machines, of which the following is a specification.

This invention relates to improvements in machines for cutting metal and is particularly adapted as a shop tool for shearing metal plates and rods, the machine being provided with a gage device which coöperates with either the instrumentalities which operate to shear plates of metal or with a set of instrumentalities which are adapted to shear rods, so that said gage may be set in such positions that a predetermined length of rod or wire or plate may be cut by the machine.

The invention consists in the novel features of construction and in the combination and arrangement of parts set forth in the following specification and particularly pointed out in the claim.

Referring to the drawings: Figure 1 is a front elevation, partly in section, of a punching and cutting machine embodying my invention. Fig. 2 is a side elevation of the machine viewed from the right hand side of Fig. 1, a portion of the machine being shown in vertical section. Fig. 3 is a side elevation of a portion of a machine embodying a modification of the punching mechanism of the machine shown in Figs. 1 and 2.

Like numerals refer to like parts throughout the several views of the drawings.

In the drawings, referring to Figs. 1 and 2, 5 and 6 are rotatable tool carriers having thereon a plurality of coöperating pairs of tools, one member of each pair being on one of said carriers and the other member being on the other of said carriers. In the present instance, these tools consist of punches and dies of various sizes, there being a series of suitable dies 7 carried by the carrier 5 and a corresponding set of punches 8 carried by the carrier 6. In the present instance, the carriers 5 and 6 are arranged with their axes at right angles, that is to say, the carrier 5 is mounted to rotate on a stud 9 upon a frame 10 to rotate about a vertical axis, while the carrier 6 is mounted to rotate on a stud 11 about a horizontal axis upon a vertically reciprocatory slide 12 which is guided in suitable ways in the frame 10.

As a means for connecting the carriers 5 and 6 to each other whereby the members of each pair of tools may be simultaneously brought to an operating point in the proper relative position to coöperate with each other, I provide the carrier 5 with a spur gear 13 meshing into a pinion 14 secured to a vertical shaft 15 journaled in suitable bearings in the frame 10 and having splined thereon a bevel pinion 16 meshing into a bevel gear 16' carried by the carrier 6. In this way, it will be seen that there is at all times a positive connection between the two carriers so that they may be rotated in unison.

It will be evident that since the carrier 6 with its gear 16' is moved vertically by the slide 12, there must be some provision for preventing the pinion 16 from coming out of mesh with the gear 16' and to that end I provide the hub of said pinion with an annular groove 17 in which is located a bifurcated arm 18 secured to the slide 12 so that said slide carries said pinion vertically in its travel with respect to the shaft 15. As a convenient means for rotating the shaft 15 to change the positions of the tool carriers 5 and 6, and lock said carriers against rotation when desired, I provide an arm 19 secured to said shaft and having a spring-pressed pin 20 adapted to enter any one of the plurality of holes 21 provided in an index plate 22. The index plate, in practice, will also serve as a convenient means of indicating the diameter of the punch which is in a position to operate and for this purpose the index plate will, of course, in practice, be provided with suitable characters.

Located above the dies 7 is a stripper 23 which serves to prevent the stock from lifting after it has been punched and also serves as a means of preventing the operator from introducing a piece of stock too thick for the punches to handle.

A reciprocatory motion is imparted to the slide 12 by any suitable mechanism as, for example, an eccentric 24 located in a horizontal slot 25 provided in the slide 12 and formed on or secured to a rock-shaft 26 provided with an actuating lever 27. As a means for shearing plates and flat shapes of bars, I provide a pair of shears consisting of a stationary cutter 28 and a movable cutter 29, the former of which is secured to the frame 10 and the latter of which is secured to the slide 12, while said frame is provided with a gap 30 across which the movable cutter operates in a well known manner.

When plates are being sheared, it is, of course, necessary that they should be introduced into the gap 30 from a machine and the gap must be left open at such times, but when the shearing of unusually heavy rods or the punching of unusually hard plates is to be done, the frame 10 may be prevented from springing at the gap 30 by means of a tie member 31 extending across said gap and secured to the frame above and below said gap. For convenience, this tie member is pivoted above the gap to a stud 32 and is provided with a jaw 33 which interengages with a lug 34 projecting from the frame below the gap so that when plates are to be sheared the tie member may be swung on its pivot from the position shown in Figs. 1 and 2 to a position above the stud 32 and will rest against the frame 10 a little toward the right of the axis of the stud so that it will remain in such position until it is desired to bring it into use again to form the tie across the gap.

As a means for cutting various sizes of rods and wires, I provide two plates 35 and 36 provided with a plurality of perforations 37 which may be of various sizes and shapes to receive the wires and rods, the plate 35 being mounted in a recess 38 in the slide 12 and the plate 36 being mounted in grooves 39, 39 provided in the frame 10, while said frame is also provided with an aperture 40 through which the wires and rods may extend.

As a convenient means for holding the two plates just described in place and for adjusting them with respect to each other so that a close working contact of their abutting surfaces may be secured, I provide a plurality of adjusting screws 41 having screw-threaded engagement with the frame 10 and having lock-nuts 41' by means of which the adjustment is preserved, the inner ends of these screws bearing against the plate 36 in such a manner that said plate may be adjusted toward the plate 35. It will also be evident that the plate 35 is held in place solely by reason of the fact that it is covered by the plate 36 and, therefore, it requires no fastening means which is, of course, convenient in the assembling or adjusting of the parts.

To gage the length of the rods and wires cut by the cutter plates 35 and 36 and the plates and rods cut by the cutters 28 and 29, I provide a gage or stop 42 consisting of a screw passing through a slot 43 provided in an arm 44, whereby said screw may be adjusted longitudinally of said arm. Lock-nuts 45 and 46 having screw-threaded engagement with the screw 42 serve as a means for securing the screw in the desired position in the slot.

The arm 44 is pivoted on a long stud 47 secured to the frame 10 so that said arm may be adjusted longitudinally of said stud for the purpose of changing the length of the pieces cut by the two cutting devices just described and since the arm can be swung on said stud the stop 42 may be utilized as a gage for either of the cutting devices at will, it being shown in full lines in Fig. 2 coöperating with the cutters 28 and 29 and in dotted lines in Fig. 2 coöperating with the cutter plates 35 and 36. It will be evident that by adjusting the arm to the proper angular position and moving the stop screw 42 longitudinally of the slot 43, the stop may be adjusted to the proper position to coöperate with any of the holes 37 and with any portion of the cutters 28 and 29. The arm 44 is adjustably secured to the stud 47 by any suitable means as, for example, by splitting said arm as shown in Fig. 2 and providing a clamping screw 48 passing through the split portion and having screw-threaded engagement with the arm on one side thereof in the well known manner.

It will be evident from the foregoing that the machine hereinbefore described is adapted to punch and shear plates, punch plates and other sheet material and cut rods and wires, all of which may be done simultaneously by the various mechanisms of the machine, or may be done one at a time, as may be desired.

Referring now to the modified form of my invention which is shown in Fig. 3, the punching mechanism shown in this form differs from that in the form first described in that the carriers 49 and 50 of the punches are mounted to rotate upon the same axis, whereas in the form first described, the axes are at right angles to each other. The carrier 49 is equipped with dies 51 and the carrier 50 with punches 52 similar to those used in connection with the first form. The carriers 49 and 50 are provided, respectively, with gears 53 and 54 meshing into pinions 55 and 56, respectively, secured to a shaft 57 journaled in suitable bearings in the frame 58. It will be observed that the pinion 56 is of extra length and it will be evident from an inspection of Fig. 3 that since this is so the carrier 50 may be reciprocated and yet the gear 54 will remain in mesh with the pinion 56. By means of the gearing just described, the two gears 53 and 54 are positively connected with each other so as to be moved in unison to bring the desired ties and punches in rotation to the operating point. As in the form of my invention first described, there is provided an arm 58 secured to the shaft 57 and having a spring-pressed pin 59 adapted to enter any one of the series of holes 60 provided in the stationary index plate 61 by means of which the shaft 57 may be rotated to bring the proper pair of punches and ties into position at the working point and lock the same.

Having thus described my invention, what I claim and desire by Letters Patent to secure is:

A machine of the class described having, in combination, a stationary member, another member slidable thereon, a pair of wire-cutting plates placed face to face and provided respectively with perforations adapted to register with each other, one of said plates mounted in said stationary member, the other in said slidable member, adjusting means in said stationary member adapted to engage the back face of the cutting plate mounted in said stationary member to move said plate to take up the wear thereof, a pair of coöperating shear cutters, one fast to said stationary member, the other fast to said slidable member, an arm adjustably mounted upon said stationary member having a slot at its free end, and a screw mounted in said slot adapted to be moved lengthwise of said slot, laterally through said slot and to be moved by said arm to coöperate with either of said pairs of cutting instrumentalities.

In testimony whereof I have hereunto set my hand in presence of two subscribing witnesses.

SEYMOUR A. BOSTWICK.

Witnesses:
LOUIS A. JONES,
SADIE V. MCCARTHY.

Copies of this patent may be obtained for five cents each, by addressing the "Commissioner of Patents, Washington, D. C."